United States Patent
Li et al.

(10) Patent No.: US 9,910,811 B2
(45) Date of Patent: Mar. 6, 2018

(54) HOT SWAP CIRCUIT

(71) Applicant: Cisco Technology, Inc., San Jose, CA (US)

(72) Inventors: Yang Li, San Jose, CA (US); Michael Robert Grant, San Jose, CA (US); Jessica Leigh Kiefer, San Jose, CA (US); Kan Chiu Seto, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 14/696,773

(22) Filed: Apr. 27, 2015

(65) Prior Publication Data

US 2016/0313783 A1 Oct. 27, 2016

(51) Int. Cl.
| H02J 7/00 | (2006.01) |
| H02J 7/14 | (2006.01) |
| G06F 13/40 | (2006.01) |
| G06F 11/20 | (2006.01) |
| H04L 1/00 | (2006.01) |

(52) U.S. Cl.
CPC .......... *G06F 13/4081* (2013.01); *G06F 11/20* (2013.01); *H04L 1/00* (2013.01); *H02J 7/0014* (2013.01); *H02J 7/0024* (2013.01); *H02J 7/0052* (2013.01)

(58) Field of Classification Search
USPC ....... 320/101, 103, 108, 155, 140, 112, 137, 320/157; 307/104, 109, 110
See application file for complete search history.

(56) References Cited

U.S. PATENT DOCUMENTS

| 6,031,702 | A | 2/2000 | Williams | |
| 6,563,235 | B1* | 5/2003 | McIntyre | H02M 3/07 307/109 |
| 8,645,753 | B2 | 2/2014 | Yang et al. | |
| 8,860,396 | B2* | 10/2014 | Giuliano | H02M 3/07 323/266 |
| 2009/0278520 | A1* | 11/2009 | Perreault | H02M 3/07 323/282 |
| 2011/0309809 | A1 | 12/2011 | Rao et al. | |
| 2013/0106342 | A1* | 5/2013 | Iwata | H02M 7/30 320/101 |
| 2013/0307479 | A1* | 11/2013 | Kim | H02J 7/007 320/112 |

(Continued)

OTHER PUBLICATIONS

International Rectifier; PD-95050C; IRFP2907PbF; HEXFET® Power MOSFET; Aug. 8, 2011; pp. 1-9.

(Continued)

*Primary Examiner* — Alexis Pacheco
(74) *Attorney, Agent, or Firm* — Parker Ibrahim & Berg LLC; James M. Behmke; Stephen D. LeBarron

(57) ABSTRACT

In one embodiment, a hot swap circuit is disclosed. The hot swap circuit includes a capacitor in parallel with an input line to a power system. The hot swap circuit also includes a switch in parallel with the input line to the power system and coupled to the capacitor. The hot swap circuit further includes circuitry configured to pre-charge the capacitor to a first voltage while the switch is open. The switch is operable to cause the capacitor to be charged from the first voltage to a second voltage when the switch is closed.

18 Claims, 7 Drawing Sheets

(56) References Cited

U.S. PATENT DOCUMENTS

| | | | |
|---|---|---|---|
| 2014/0015474 A1* | 1/2014 | Tsai | H02J 7/0042 |
| | | | 320/103 |
| 2014/0097791 A1* | 4/2014 | Lisuwandi | H01F 38/14 |
| | | | 320/108 |
| 2014/0197971 A1* | 7/2014 | Kuppambatti | G06F 1/08 |
| | | | 341/110 |

OTHER PUBLICATIONS

Marcus O'Sullivan; "Understanding Hot Swap: Example of Hot-Swap Circuit Design Process"; vol. 42; May 2008; pp. 1-8.

* cited by examiner

HOT SWAP CIRCUIT

TECHNICAL FIELD

The present disclosure relates generally to electronic devices, and, more particularly, to a hot swap circuit.

BACKGROUND

Many devices, such as networking and computing devices (e.g., servers, switches, disk arrays, etc.), require the ability to update or replace faulty equipment without interrupting the functioning of the rest of the system. For example, a device may have a backplane to which a number of removable computing modules can be coupled. During operation of the device, modules may be added, removed, or replaced, as needed (e.g., to increase functionality of the device, to replace a failing module, etc.). However, inrush currents when making such changes may be relatively high. To protect against such currents, a hot swap circuit may be used to regulate the inrush current to a module while making changes to the modules of the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a hot swap circuit is disclosed. The hot swap circuit includes a capacitor in parallel with an input line to a power system. The hot swap circuit also includes a switch in parallel with the input line to the power system and coupled to the capacitor. The hot swap circuit further includes circuitry configured to pre-charge the capacitor to a first voltage while the switch is open. The switch is operable to cause the capacitor to be charged from the first voltage to a second voltage when the switch is closed.

In further embodiments, a method is disclosed. The method includes controlling a first switch coupled to a capacitor in a hot swap circuit to remain open during a first period of time. The method also includes controlling a second switch in the hot swap circuit during the first period of time to charge the capacitor to a pre-charge voltage level by supplying voltage from a power source for the hot swap circuit to the capacitor. The method further includes controlling the first switch to close at a time subsequent to the first period of time. The first switch experiences an initial voltage drop equal to a difference between a supply voltage provided by the power source and the pre-charge voltage level of the capacitor.

In other embodiments, a hot swap circuit is disclosed. The hot swap circuit includes voltage storage means for storing an input voltage. The hot swap circuit also includes means for controlling an initial voltage drop across a switch by pre-charging the voltage storage means to a pre-charge voltage level.

Description

Various hot swap circuit designs are provided herein that are operable to protect against large inrush currents, such as when a hardware module is plugged into a live computing device. In some of the designs disclosed herein, conduction losses are minimized through the placement of a hot swap switch, such a metal-oxide semiconductor field effect transistor (MOSFET). In addition, the designs herein allow for a small voltage drop across the hot swap switch, allowing for a smaller switch/transistor to be used.

Figure 1:
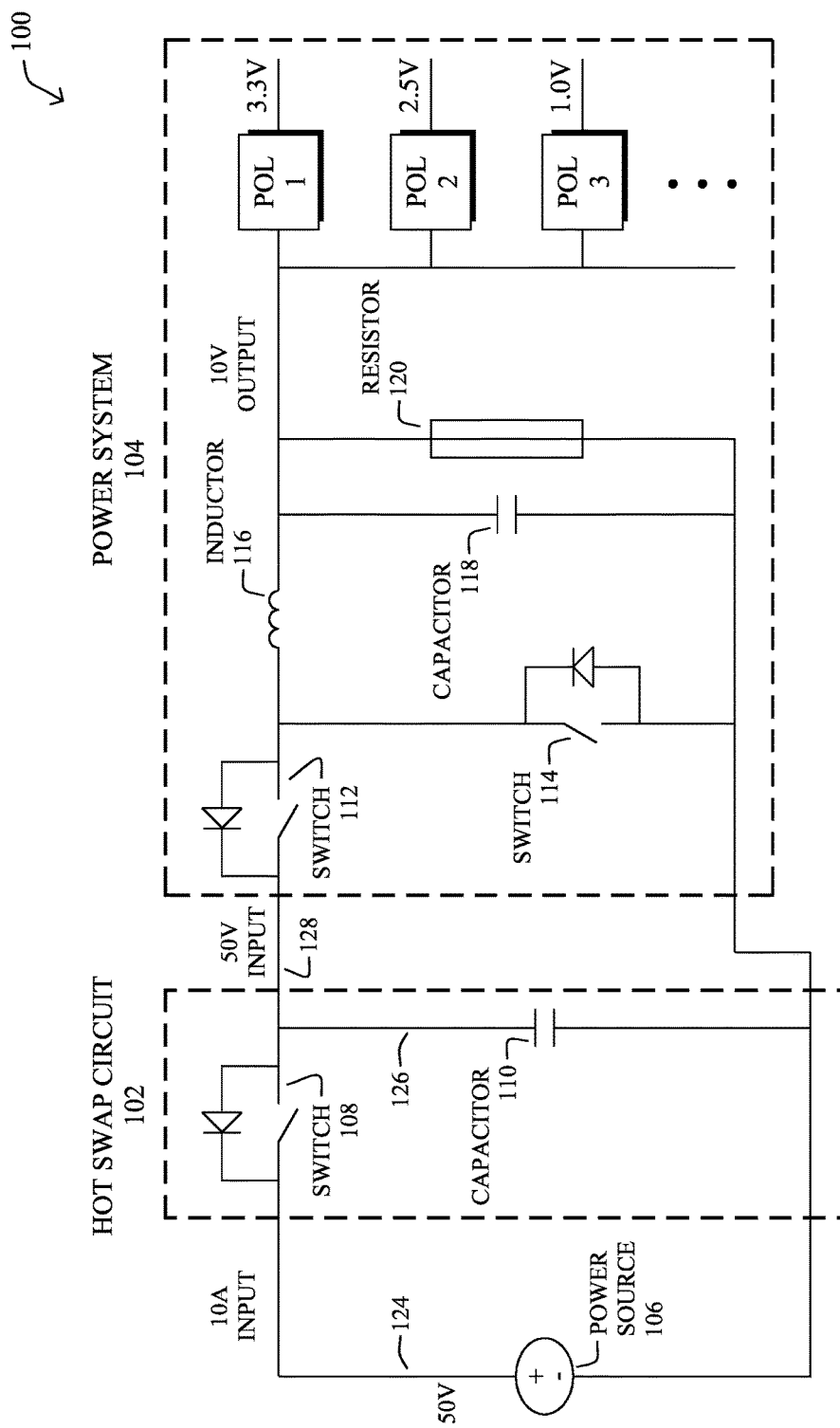
FIG. 1 illustrates an example hot swap circuit.

Referring now to FIG. 1, an example hot swap circuit is shown, according to some embodiments. As shown, system 100 may generally include a power system 104 and a hot swap circuit 102 powered by a power source 106. In general, hot swap circuit 102 may operate to prevent a large inrush current from power source 106 during a startup event (e.g., a new module is plugged into a running computing device, etc.). Power system 104 may work in conjunction with hot swap circuit 102 to step down the supplied voltage from power source 106 and hot swap circuit 102 into a lower voltage that may be adjusted into any number of different output voltages by point of load converters (POLs) 122 (e.g., a first POL, a second POL, etc.).

In various embodiments, power system 104 may include a switch 112 in series with the input line 128 to power system 104 and an inductor 116 coupled to switch 112. Running parallel off of input line 128 to power system 104 are switches 114, capacitor 118, and a resistor 120. Switches 112 and 114 may comprise MOSFETs or other suitable components that are operable to control the flow of current through power system 104. As would be appreciated by one skilled in the art, switches 112-114, inductor 116, capacitor 118, and resistor 120 may be sized accordingly, to step down the input voltage provided to power system 104 via line 128 to a lower voltage, as desired. For example, as shown, the components of power system 104 may be operable to step down a 50V input voltage to a 10V output voltage provided to POLs 122. For example, inductor 116, capacitor 118, and resistor 120 may form an RLC low-pass filter and may be sized according to a desired corner frequency ($\omega_c$) and damping factor ($\zeta$) as follows:

$$\omega_c = \frac{1}{\sqrt{LC}}$$

$$\zeta = \frac{1}{2R}\sqrt{\frac{L}{C}}$$

where L is the inductance of inductor 116, R is the resistance of resistor 120, and C is the capacitance of capacitor 118.

As noted previously, POLs 122 may be operable to provide voltage to any number of different loads (e.g., pins, other electrical connectors, etc.). In one embodiment, POLs 122 may comprise a voltage divider that divides the resulting output voltage from switches 112-114, inductor 116, capacitor 118, and resistor 120. For example, assume that power source 106 supplies 50 Volts (V) at 10 Amperes (A) within system 100. In such a case, 50V may be supplied to power system 104 via input line 128. In turn, power system 104 may step down the 50V to 10V or any other lower voltage. In turn, POLs 122 may be configured to convert the resulting 10V into the desired load voltages (e.g., the first POL may output a voltage of 3.3V, the second POL may output a voltage of 2.5V, the third POL may output a voltage of 1.0V, etc.). In other embodiments, other step down circuits may be used in power system 106, to convert the input voltage on input line 128 of power system 104 to a lower voltage.

In the example shown in FIG. 1, hot swap circuit 102 may include a switch 108 in series with power source 106 along power input line 124. A control signal may be provided to switch 108 to actuate switch 108. For example, a microcontroller or other control circuitry (not shown) may provide a control signal to switch 108 to open or close switch 108. Hot swap circuit 102 may also include an input capacitor 110 located along line 126 that is in parallel to input line 128 of power system 106. Since power system 106 and other similar step down circuits do not have inductors directly at their power inputs, capacitor 110 may be relatively large, to filter the voltage ripple in system 100. For example, capacitor 110 may be a 47 micro Farad (g), aluminum electrolytic capacitor, if the voltages and currents shown are used. Other sizes of capacitor 110 may also be used, if other voltages and currents are used. In one embodiment, switch 108 may comprise a MOSFET of suitable properties, although other switching mechanisms may also be used, in further embodiments.

Figure 2:
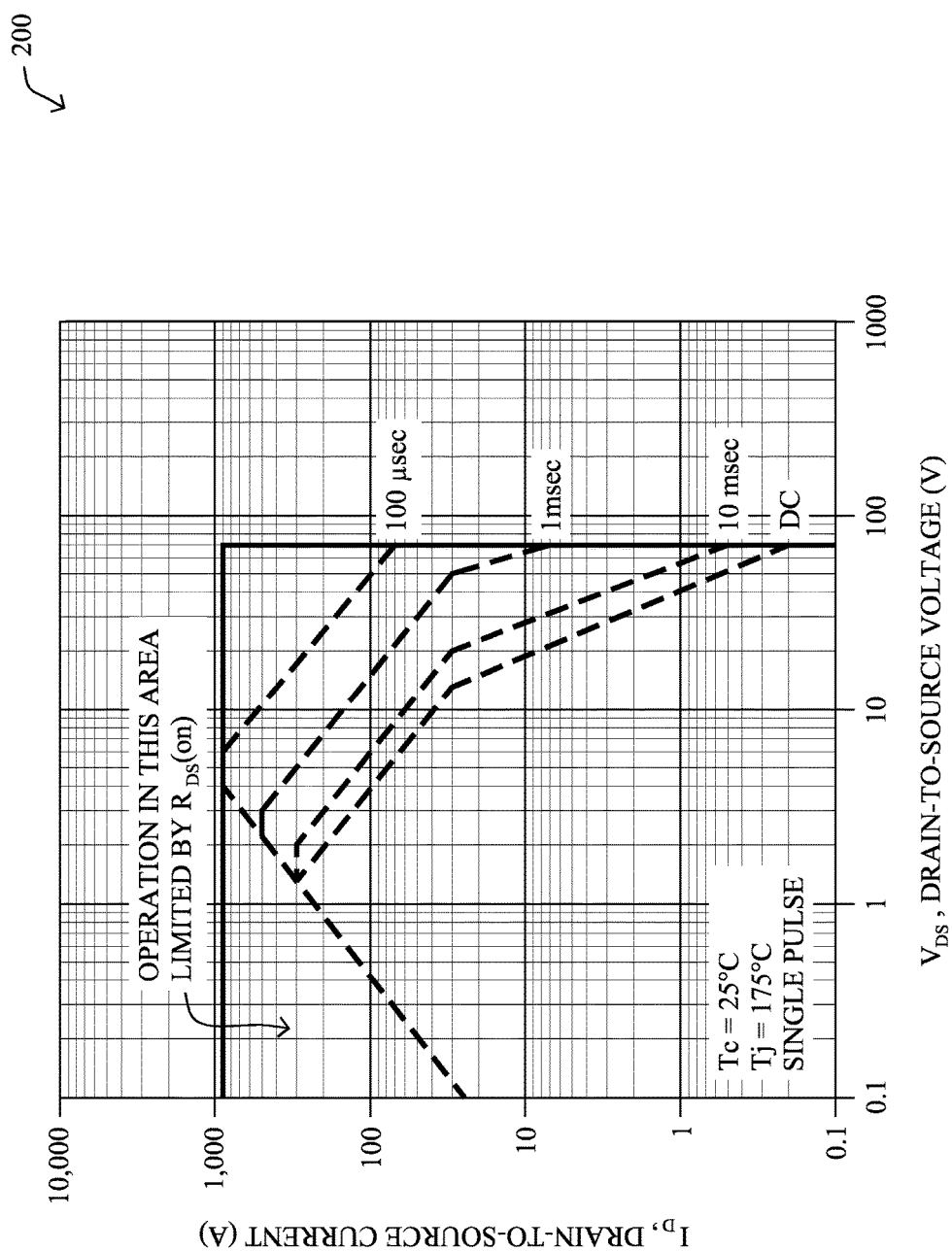
FIG. 2 illustrates an example graph of the maximum safe operating area (SOA) of a transistor.

Referring now to FIG. 2, an example graph of the maximum safe operating area (SOA) of a transistor is shown, according to one embodiment. As shown, graph 200 depicts the time-varying operational responses of an exemplary MOSFET that may be used for switch 108 in hot swap circuit 102. In particular, graph 200 maps the drain-to-source current ($I_D$) for an exemplary MOSFET to its drain-to-source voltage ($V_{DS}$) as a function of time, thereby defining the minimum SOA for the MOSFET. This mapping is shown on a logarithmic scale and assumes several conditions for the MOSFET such as a single input pulse and the temperature range of the device. For example, one exemplary MOSFET that may exhibit the behavior shown in graph 200 is the IRFP2907PBF power MOSFET by International Rectifier™. Other transistors may also be used, in other embodiments.

While hot swap circuit 102 may be operable to provide protection against inrush currents during a startup event, several observations can be made with respect to graph 200 and switch 108. First, switch 108 may require a longer turn on time, to make sure there is no inrush current to system 100 during a startup event. For example, the turn on time for switch 108 may be 10 milliseconds (ms) or even higher, depending on the implementation. Second, from graph 200, the $I_D$ currents within the SOA for the exemplary MOSFET decrease as the $V_{DS}$ voltages and turn on times increase. Thus, to support a high turn on time, as well as a high $I_D$ current, a relatively large MOSFET may be required for switch 108. In addition, since switch 108 is in series with power source 106, switch 108 may result in a certain amount of conduction loss within hot swap circuit 102, thereby lowering the efficiency of the circuit.

Figure 3:
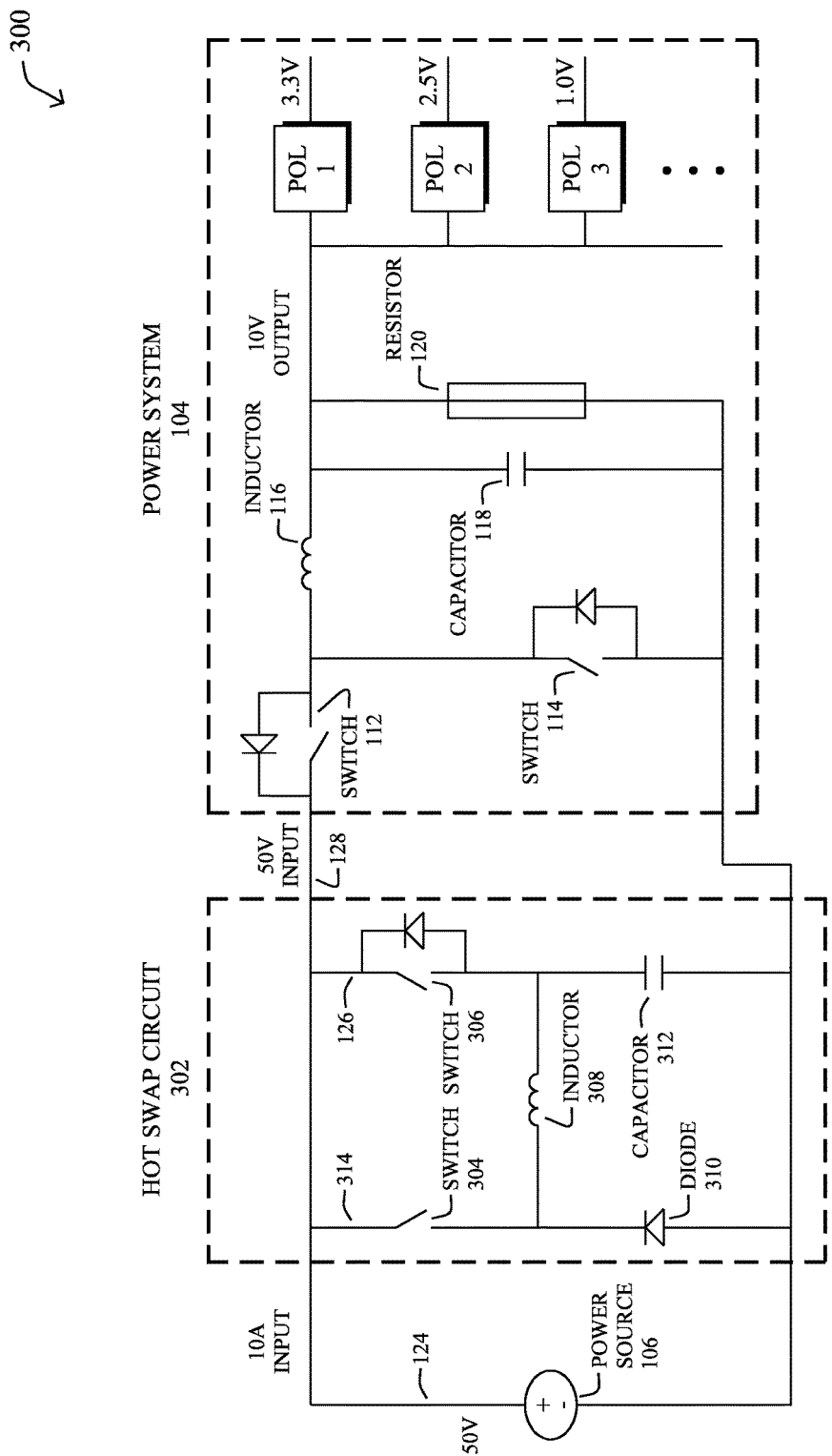
FIG. 3 illustrates another example hot swap circuit.

Referring now to FIG. 3, another example hot swap circuit is shown, according to various embodiments. As shown, assume that system 300 includes the same power system 104 and power source 106 as that of system 100. However, system 300 may include a hot swap circuit 302 having a different configuration than that of hot swap circuit 102. Notably, whereas hot swap circuit 102 has switch 108 in series with power source 106 along power input line 124, hot swap circuit 302 instead includes a hot swap switch 306 (e.g., a hot swap MOSFET) located along the same line 126 as that of the input capacitor 312, which is in parallel to input line 128 to power source 106. Since there are no switches/MOSFETs in series with power source 106 along line 124 in hot swap circuit 302, there are also no corresponding conduction losses that result, thereby increasing the efficiency of hot swap circuit 302 over that of hot swap circuit 102.

In various embodiments, hot swap circuit 302 also includes a buck circuit that comprises a switch 304, inductor 308, and diode 310. In particular, as shown, hot swap circuit 302 may also include a line 314 that runs parallel to lines 126 and a line 316 that connects lines 314 and 126 (e.g., after switches 304-306). Switch 304 may be located along line 314, inductor 308 may be located along line 316, and diode 310 may be in parallel to inductor 308. During operation, the buck circuit formed by switch 304, inductor 308, and diode 310 may be controlled to pre-charge capacitor 312, thereby lowering the initial voltage drop (e.g., $V_{DS}$) across switch 306 when switch 306 is closed. In other words, the initial voltage drop across switch 306 may be equal to the voltage difference between the voltage supplied by power source 106 and the pre-charge voltage on capacitor 312. Accordingly, switch 304, inductor 308, and diode 310 may be sized appropriately, to effect a lower initial voltage drop across switch 306. Switches 304 and 306 may be actuated by respective control signals that cause switches 304 and 306 to open and close. For example, one or more microcontrollers or other control circuitry (not shown) may provide the control signals to switches 304 and 306, respectively.

Figure 4:
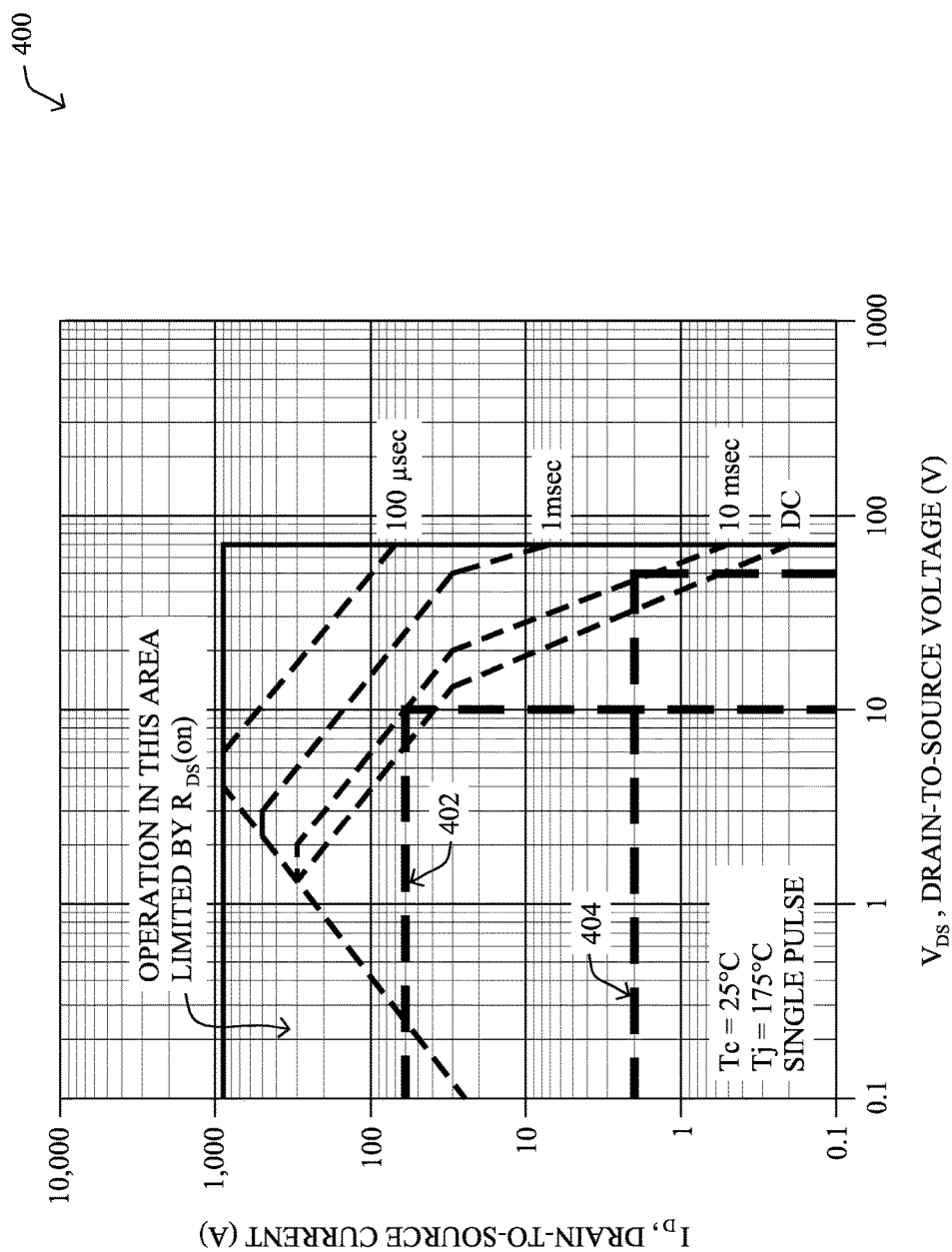
FIG. 4 illustrates an example graph comparing the transistor responses from the circuits of FIGS. 1 & 3.

FIG. 4 illustrates an example graph 400 comparing the transistor responses of switches 108 and 306 from systems 100 and 300 shown in FIGS. 1 and 3, respectively. For purposes of illustration, assume that both of switches 108 and 306 comprise an IRFP2907PBF MOSFET exhibiting the response behaviors depicted in graph 400. Also, assume that in both of systems 100 and 300 that power source 106 provides 50V and 10 A to hot swap circuits 102 and 302 at a 10 ms pulse. In such a case, the exemplary response of switch 108 is depicted as curve 402 and the exemplary response of switch 306 is depicted as curve 404. In particular, given the location of switch 108, the experienced voltage across the MOSFET of switch 108 will be the full 50V provided by power source 106. Thus, as shown by curve 404, the corresponding current that the MOSFET can handle is limited to 2 A.

In contrast to the response of switch 108, consider the case in which capacitor 312 in hot swap circuit 302 is pre-charged to a voltage of 40V. Thus, at switch 306, the 50V supplied by power source 102 may be offset by the voltage across capacitor 312 (e.g., 40V), resulting in a voltage across the MOSFET of switch 306 of only 10V. As shown by curve 404, this means that the MOSFET in switch 306 can safely handle up to 50 A of current, a fivefold increase over that of the MOSFET in switch 108. This means that switch 306 may be significantly smaller in size than that of switch 108. In addition, the location of switch 306 in hot swap circuit 102 over that of switch 108 also means lower conduction losses, since there is no switch in series with power source 106 in hot swap circuit 302.

Figure 5:
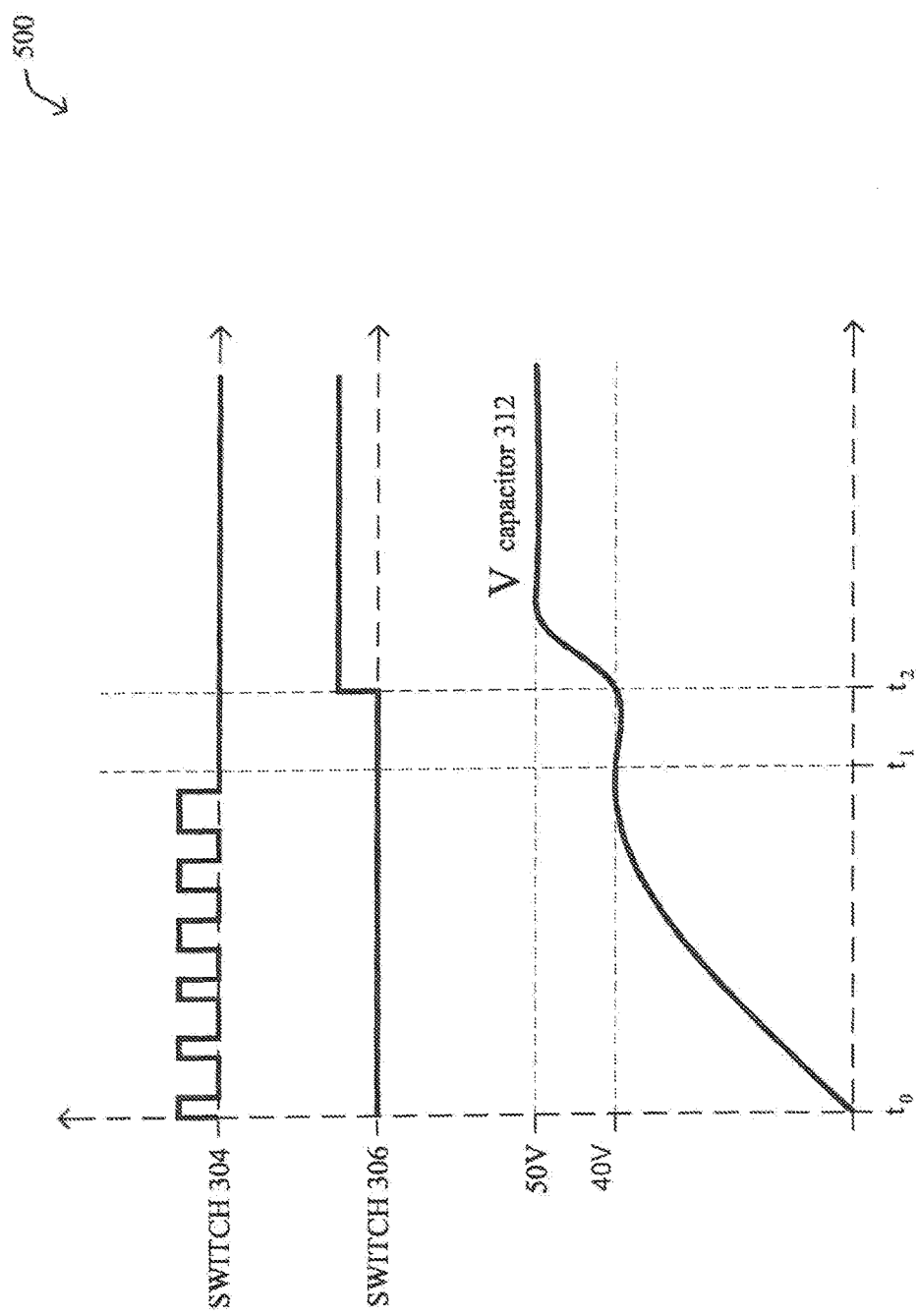
FIG. 5 illustrates example control signals that may be used in a hot swap circuit.

Referring now to FIG. 5, an example set of control signals that may be used in a hot swap circuit are shown, according to various embodiments. As shown in graph 500, hot swap circuit 302 may be operated in three distinct modes of operation. In the first mode, capacitor 312 may be charged via operation of the buck circuit (e.g., switch 304, inductor 308, and diode 310) to a desired pre-charge voltage level. For example, a high frequency pulse signal may be sent to switch 304 to open/close switch 304 between times $t=t_0$ and $t=t_1$, thereby providing voltage from power source 106 to capacitor 312. The maximum pre-charge voltage across capacitor 312 may also be controlled by varying the duty cycle of the pulse signal sent to switch 304. For example, if the control signal sent to switch 304 has a maximum duty cycle of 4/5 and power source 106 supplies 50V of voltage, the pre-charge voltage across capacitor 312 would be 50V* (4/5)=40V. As would be appreciated, the current on the buck circuit will be relatively small, thereby allowing for a higher switching frequency for switch 304 and the use of smaller components in the buck circuit. During this period of time, switch 306 may be held open, to allow the buck circuit to pre-charge capacitor 312.

At time $t=t_1$, capacitor 312 has reached its pre-charge voltage limit and hot swap circuit 302 may be placed into a second mode of operation. Notably, from time $t=t_1$ to $t=t_2$, a constant control signal may be provided to switch 306, to hold switch 306 open for a delay period of time. During this time, the voltage across capacitor 312 remains constant at its pre-charge voltage (e.g., 40V).

At time $t=t_2$, the control signal sent to switch 306 is changed, to place hot swap circuit 302 into its third mode of operation. Notably, in this mode, the control signal causes switch 306 to close, thereby creating an initial voltage difference across switch 306 as capacitor 312 is further charged. However, since capacitor 312 has already been pre-charged to a desired pre-charge voltage level (e.g., 40V), the voltage difference across switch 306 (e.g., $V_{DS}$) may be reduced to a lower initial voltage than that provided by power source 106. For example, if power source 106 provides 50V and capacitor 312 is pre-charged to 40V, $V_{DS}$ across switch 306 at $t=t_2$ will be only 10V, thereby allowing switch 306 to safely handle a much larger current than that of switch 108 in hot swap circuit 102 and be significantly smaller than that of switch 108. At times beyond $t=t_2$, capacitor 312 is then charged from its pre-charge voltage (e.g., 40V) to the full voltage provided by power source 106 (e.g., 50V). In another embodiment, capacitor 312 may be pre-charged to an even greater voltage, thereby reducing the initial voltage difference across switch 306 even further when switch 306 is closed.

Figure 6:
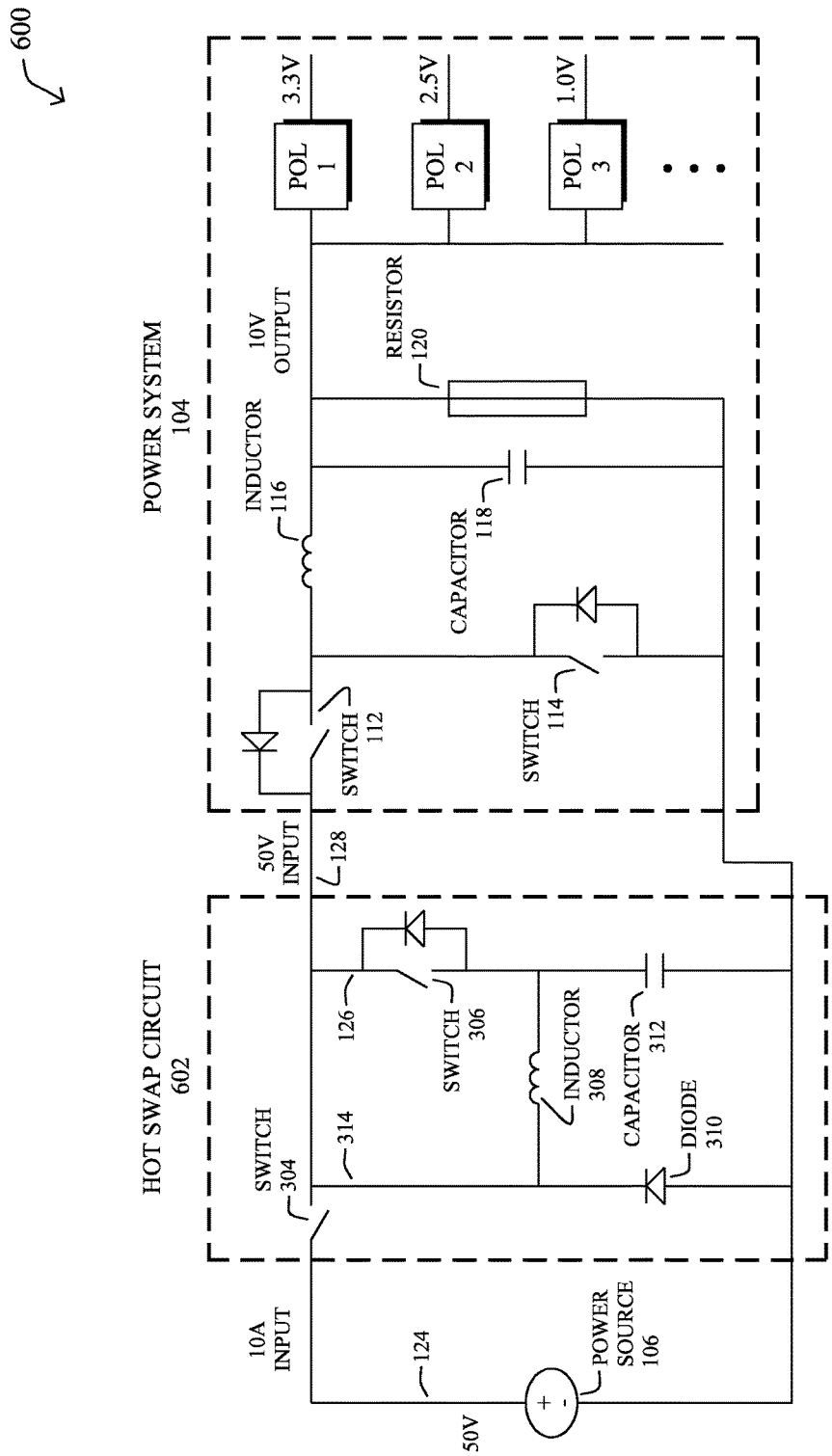
FIG. 6 illustrates a further example hot swap circuit.

Referring now to FIG. 6, another example how swap circuit is shown, according to various embodiments. As shown, system 600 may include the same power source 106 and power system 104 as that of systems 100 and 300. However, system 600 includes hot swap circuit 602, which is one possible variation of hot swap circuit 302. In general, hot swap circuit 602 may operate in a similar manner as that of hot swap circuit 302 to pre-charge input capacitor 312, thereby reducing the voltage across switch 306. Consequently, switch 306 may be much smaller than that of switch 108 in system 100. Additionally, in contrast to switch 108, switch 306 is not in series with power source 106, meaning that system 600 will have higher efficiency than that of system 100, since conduction losses may be reduced.

As shown, similar to hot swap circuit 302, input capacitor 312 and switch 306 may be located along line 126 that runs parallel to the input line 128 to power system 104. Also similar to hot swap circuit 302, diode 310 may be located in circuit 602 along line 314 that runs parallel to lines 126 and inductor 308 may be located along line 316 connecting lines 314 and 126. However, while switch 304 in hot swap circuit 302 is located along line 314, switch 304 is located in series with power source 106 along line 124 in hot swap circuit 602.

Operationally, switches 304 and 306 may be controlled in hot swap circuit 602 in a manner similar to that of circuit 302, as depicted in FIG. 5. In particular, switch 304 may be operated while switch 306 is held open during a first period of time, to charge capacitor 312 to a desired pre-charge voltage. As would be appreciated, the components in hot swap circuit 302 may be sized and controlled accordingly, to produce the desired amount of pre-charge voltage across capacitor 312.

After capacitor 312 has been pre-charged, switch 306 may be closed. Once switch 306 is closed, capacitor 312 may be charged up to the voltage level provided by power source 106. As in hot swap circuit 302, since the initial voltage drop across switch 306 is significantly reduced from that of the source voltage of power source 106, switch 306 may also be comparatively smaller than that of switch 108 in system 100.

Figure 7:
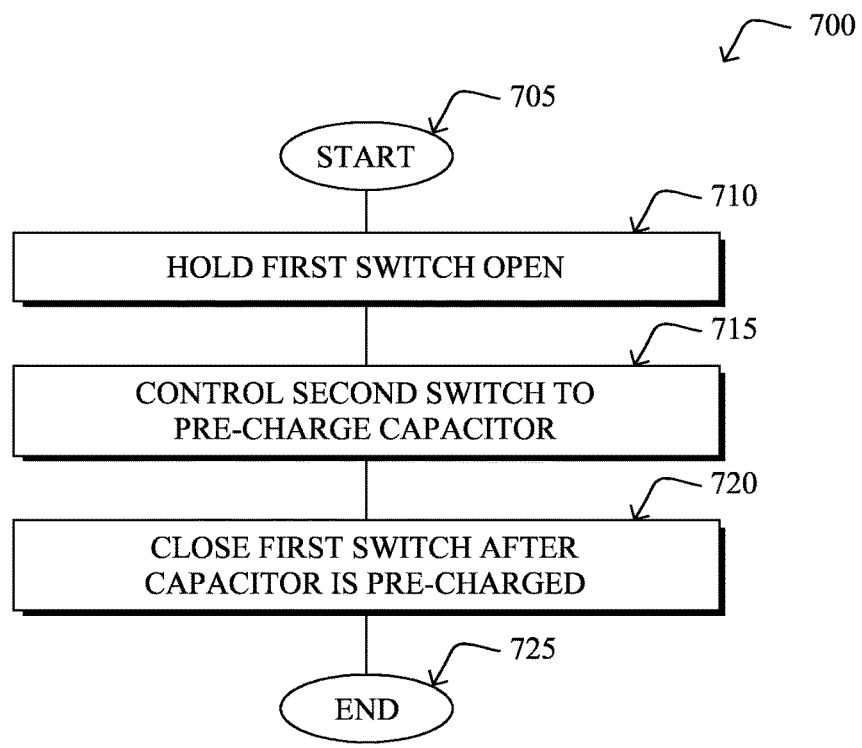
FIG. 7 illustrates an example simplified procedure for operating a hot swap circuit.

Referring now to FIG. 7, an example simplified procedure for operating a hot swap circuit is shown, according to various embodiments. In general, procedure 700 may be performed by one or more microcontrollers, one or more application specific integrated circuits (ASICs), one or more processors executing software, or any other circuitry operable to provide control signals to the switches of a hot swap circuit (e.g., switches 304-306, etc.). Procedure 700 may start at step 705 and continue on to step 710 where, as described in greater detail above, a first switch of the hot swap circuit may be held open during a first period of time. For example, as shown in FIG. 5, switch 306 in hot swap circuits 302, 602 may be held open for a first period of time.

At step 715, as detailed above, a second switch in the hot swap circuit may be controlled to pre-charge a capacitor coupled to the first switch. In particular, in some embodiments, the second switch may be operated to provide voltage from a power source for the hot swap circuit during the first period of time in which the first switch is held open. For example, as shown in FIG. 5, switch 304 in hot swap circuits 302, 602 may be opened and closed during the first period of time, to allow the capacitor to be charged to a desired pre-charge voltage level while switch 306 is held open.

At step 720, the first switch may be closed at a time subsequent to the first period of time, as described in greater detail above. For example, as shown in FIG. 5, switch 306 may be closed at time $t=t_2$, after capacitor 312 has been charged to its desired pre-charge voltage level. At this time, the initial voltage drop across switch 306 will be considerably reduced from that of the input voltage from power source 106. As would be appreciated, the amount of pre-charge voltage provided to capacitor 312 may be selected as desired to result in a desired amount of initial voltage drop across the first switch when the first switch is closed. Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, provide for hot swap circuit designs that allow for an input capacitor to be pre-charged to a desired level (e.g., using a buck circuit, etc.), thereby reducing the initial voltage difference across the primary switch for the hot swap circuit when the switch is first closed. In some implementations, the switch may also be located in parallel to the power source, thereby reducing the amount of conduction loss in the hot swap circuit. Since the initial voltage drop across the switch is reduced when the switch is activated, a comparatively small switch (e.g., a MOSFET) may be used, since a lower voltage drop allows the switch to safely handle a much larger inrush current.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. For example, the size of the components described herein may be sized by one skilled in the art based on the desired source voltage and desired initial voltage drop across the switch of the hot swap circuit, without deviating from the teachings herein. Therefore, it is the object of the appended claims to cover all such variations and modifications as come within the true spirit and scope of the embodiments herein.

What is claimed is:

1. A hot swap circuit comprising:
   a capacitor in parallel with an input line to a power system;
   a switch in parallel with the input line to the power system and coupled to the capacitor wherein the switch is in series with the capacitor in a same line;
   an inductor disposed between the switch and the capacitor, wherein the inductor is in parallel with the capacitor; and
   circuitry configured to pre-charge the capacitor to a first voltage while the switch is open, wherein the switch is operable to cause the capacitor to be charged from the first voltage to a second voltage when the switch is closed.

2. The hot swap circuit as in claim 1, wherein a voltage drop across the switch when the switch is closed is equal to a difference between the first voltage and the second voltage.

3. The hot swap circuit as in claim 1, further comprising:
   an input power line; and
   a power source, wherein the second voltage comprises an input voltage provided by the power source along the input power line.

4. The hot swap circuit as in claim 3, wherein the circuitry configured to pre-charge the capacitor comprises a buck circuit.

5. The hot swap circuit as in claim 4, wherein the switch is a first switch, and wherein the buck circuit comprises:
   a second switch;
   a diode coupled to the second switch; and
   wherein the second switch when closed causes the capacitor to be charged to the first voltage.

6. The hot swap circuit as in claim 5, wherein the second switch is in parallel with the first switch.

7. The hot swap circuit as in claim 5, wherein the second switch is located along the input power line, and wherein the diode is in parallel to the inductor, first switch, and the capacitor.

8. The hot swap circuit as in claim 3, wherein the power source provides five or more amperes of current.

9. The hot swap circuit as in claim 1, wherein the switch comprises a metal-oxide semiconductor field effect transistor (MOSFET).

10. The hot swap circuit as in claim 1, wherein the second voltage is 50 volts.

11. The hot swap circuit as in claim 1, wherein the capacitor is an aluminum electrolytic capacitor.

12. The hot swap circuit as in claim 11, wherein the capacitor is a 47 μF capacitor.

13. The hot swap circuit as in claim 1, further comprising the power system, wherein the power system is configured to step down the second voltage to one or more lower voltages.

14. The hot swap circuit as in claim 13, wherein the power system comprises:
   a plurality of point of load converters.

15. A method comprising:
   controlling a first switch coupled in series to a capacitor in a same line of a hot swap circuit to remain open during a first period of time, an inductor is disposed between the first switch and the capacitor and wherein the inductor is in parallel with the capacitor;
   controlling a second switch in the hot swap circuit during the first period of time to charge the capacitor to a pre-charge voltage level by supplying voltage from a power source for the hot swap circuit to the capacitor; and
   controlling the first switch to close at a time subsequent to the first period of time, wherein the first switch experiences an initial voltage drop equal to a difference between a supply voltage provided by the power source and the pre-charge voltage level of the capacitor.

16. The method as in claim 15, further comprising:
   controlling the first and second switches to remain open during a second period of time immediately after the first period of time.

17. The method as in claim 15, wherein the first and second switches are in parallel.

18. The method as in claim 15, wherein the second switch is adjacent to the power source.

* * * * *